United States Patent [19]

Scheu, Jr.

[11] 4,230,250
[45] Oct. 28, 1980

[54] SOLDER EXTRACTOR

[76] Inventor: William E. Scheu, Jr., 22 Sedgemere Rd., Center Morchies, N.Y. 19934

[21] Appl. No.: 34,410

[22] Filed: Apr. 30, 1979

[51] Int. Cl.³ .............................................. B23K 3/02
[52] U.S. Cl. ...................................... 228/20; 219/230
[58] Field of Search ............................ 228/20, 51–53; 219/230

[56] References Cited

U.S. PATENT DOCUMENTS

| | | | |
|---|---|---|---|
| 3,392,897 | 7/1968 | Siegel | 228/20 |
| 3,842,240 | 10/1974 | Wakita et al. | 219/230 |

Primary Examiner—Charlie T. Moon
Assistant Examiner—K. J. Ramsey
Attorney, Agent, or Firm—Howard C. Miskin

[57] ABSTRACT

The solder extractor includes a hollow handle rear section housing a suction connected receiver and a front section carrying an electrically heated tubular tip and a coaxial communicating rearwardly projecting coupling tube. One of a pair of end-to-end hinged posts projects forwardly and eccentrically from the rear section and the front section is coupled to the other post by an elongated bolt slidably engaging axial bores in the posts and screw engaging the rear section. In operative position the post are coaxially locked and the rear section secured to the posts with the coupling tube connected to the receiver by the tightened bolt and to position the sections for cleaning the bolt is retracted to allow retraction of the front section and coupling tube and to relatively unlock the posts to permit the swinging of the rear section affording access to the bore therethrough for cleaning.

8 Claims, 3 Drawing Figures

SOLDER EXTRACTOR

BACKGROUND OF THE INVENTION

The present invention relates generally to improvements in tools for repairing electronic networks and it relates more particularly to an improved solder extractor.

In the servicing and repair of electrical and electronic circuit networks it is frequently necessary to replace electronic components or elements and to this end the melting and removal of solder joints or fillets are required. This procedure is commonly accomplished with a solder extractor which includes a heated tubular tip for melting the solder joint and a source of suction connected to the heated tubular tip by way of an enlarged receiver whereby the molten solder is sucked through the tubular tip and discharged into the receiver. However, the solder extractors heretofore available or proposed possess many drawbacks and disadvantages. The conventional solder extractor is often unreliable and hazardous, difficult, and awkward and time consuming to service and maintain, generally inconvenient to use, of little versatility and adaptability and otherwise leaves much to be desired.

A solder extractor which is highly satisfactory is disclosed in copending U.S. patent application Ser. No. 010,639 filed Feb. 9, 1979, by William E. Scheu, Jr. and a solder extractor of the subject type is described in U.S. Pat. No. 3,392,897 granted July 16, 1968. However the cleaning of these solder extractors, particularly the front or working portion thereof, is often very difficult, generally requiring the disassembly of the device and the complete separation of the handle receiver and working sections thereof, a time-consuming and awkward procedure requiring a high degree of care to avoid injury to the person and damage to proximate objects.

SUMMARY OF THE INVENTION

It is a principal object of the present invention to provide an improved tool or instrument for the repair and servicing of electronic and electrical networks.

Another object of the present invention is to provide an improved solder extractor.

Still another object of the present invention is to provide an improved solder extractor which is easy and convenient to service and clean.

A further object of the present invention is to provide an improved solder extractor which may be rapidly and safely cleaned without the neccessity of complete disassembly.

Still a further object of the present invention is to provide a device of the above nature characterized by its ruggedness, simplicity, reliability and high versitility and adaptability.

The above and other objects of the present invention will become apparent from a reading of the following description taken in conjunction with the accompanying drawings which illustrate a preferred embodiment thereof.

The present invention contemplates the provision of an improved solder extractor device which is simple and convenient to service and clean and which comprises a longitudinally extending hollow handle rear section which houses a solder receiver receptable connectable to a suction source and having a front inlet opening a front section including a bracket supporting a heater member engaging a forwardly projecting tubular tip member and a rearwardly extending coupling tube coupled to said tip member support means connecting the front and rear sections end-to-end for relative swinging between a first position with the rear of the coupling tube in registry with the receiver inlet opening and a second position with the rear of the coupling tube out of registry with the inlet opening and means for releasably locking the front section in its first position.

In the preferred form of the improved solder extractor device the front and rear sections have confronting mount plates separated by spacer member and separably screw connected and a first of a pair of hinged end-to-end posts having axial bore eccentrically mounted in the rear section mount plate. An elongated rod having an enlarged head at one end and being threaded at the other end slidably engages a bore in the front section mount plate, the post bores and an axially aligned tapped bore in the rear section mount plate. In operative position the rod is tightly screwed to lock the assembled parts and by removing the spacer screws and loosening and partly withdrawing the rod the front section may be advanced from the rear section to withdraw the coupling tube and then swung with the front post and rod to expose and provide access to the coupling tube while holding the device by the handle section. The cleaning and servicing and the reassembly of the extractor device is thus simple, rapid and convenient.

DESCRIPTION OF THE PREFERRED EMBODIMENT

Figure 1:
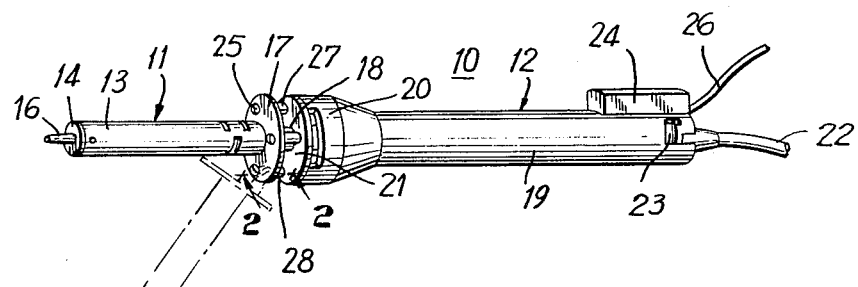
FIG. 1 is a perspective view of a solder extractor emboding the present invention with the front section shown by full line in its operative position and shown by broken line in its servicing position.
Figure 2:
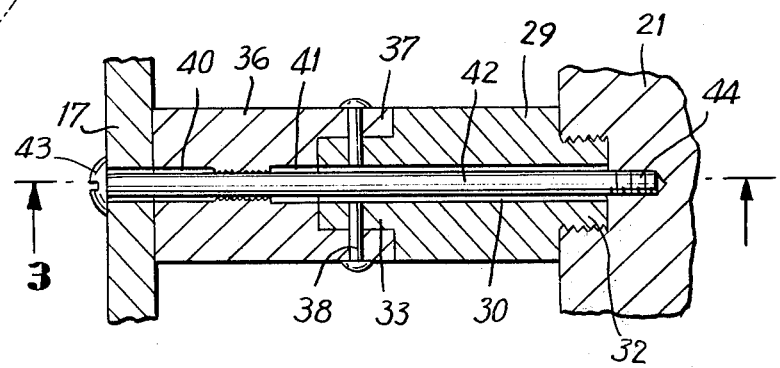
FIG. 2 is an enlarged sectional view taken along line 2—2 of FIG. 1.
Figure 3:
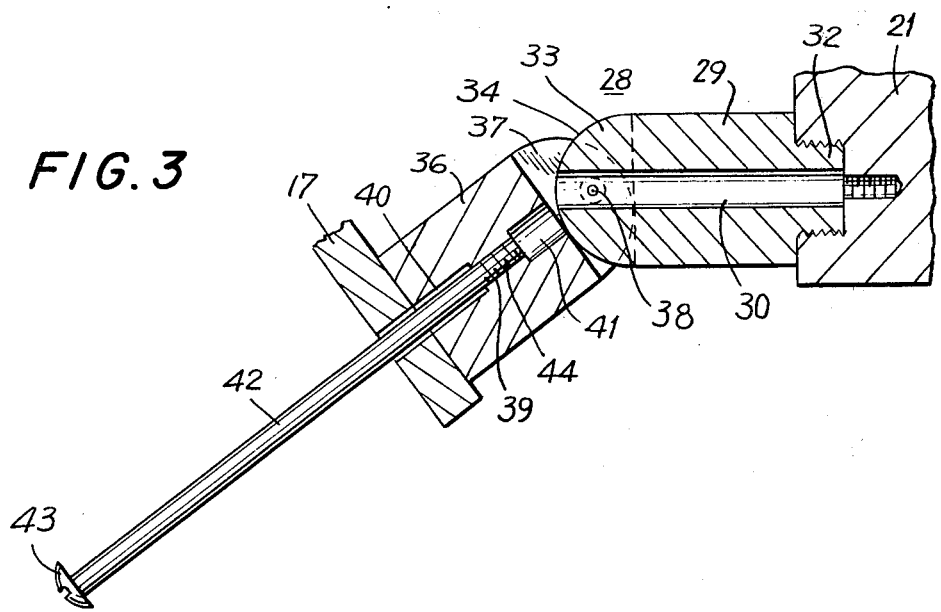
FIG. 3 is an enlarged sectional view taken along line 3—3 in FIG. 2 but with the device in its servicing position.

Referring now to the drawings which illustrate a preferred embodiment of the present invention the reference numeral 10 generally designates the improved solder extractor device which includes a working front section 11 and a normally coaxial rear or handle section 12 which houses a coaxial tubular receiver member provided with a front inlet opening. The front and rear sections 11 and 12 are similar in construction to the corresponding sections described in the above identified U.S. Pat. No. 3,392,897 or to those disclosed in the above identified copending application Ser. No. 010,639. The present invention is directed primarily to the combination including the structure interconnecting the front and rear sections 11 and 12.

The front section 11 includes a longitudinal tubular bracket 13 telescopically supporting at its front end a cylindrical electric heating member 14 having an axial bore which engages a forwardly projecting tapered tubular tip member 16 which is removably coupled to heating member 14. Secured to the rear end of tubular bracket 13 is a centrally apertured circular or annular mount plate 17. A coupling tube 18 communicates with a hollow tip member 16 and projects coaxially rearwardly through mount plate 17.

The rear section 12 includes a tubular handle defining body member 19 terminating at its front end in a forwardly projecting tubular enlarging hub or cowl 20 to the front face of which is secured an annular mount plate 21 preferrably of a heat insulating material. A tubular, preferrably glass receptacle or receiver is coaxial housed in handle 19 and has a rear opening closed by a removable axially bored closure plug connected by a tube 22 to a suitable source of suction and releasably locked in closed position by a rotatable arm carried by the plug assembly and a bayonnet slot 23 formed in the handle trailing end. A junction box mounted on handle 13 couples extendable electrical leads extending from heating member 14 through handle 19 to a power cord 26.

In normal operating condition the front and rear sections 11 and 12 are coaxial with the mount plates parallel and longitudinally spaced by a pair of peripherally spaced cylindrical spacer members 27 and a hinge assembly 28 peripherally spaced between spacer members 27. The spacer members 27 are mounted on and projects forwardly of mount plate 21 and mount plate 17 is separably secured to the spacer members 27 by screws 25 which engaged tapped bores in spacer members 27 or in plate 21.

The hinge assembly 28 includes a rear first cylindrical post 29 having an axial through bore 30 and terminating at its rear in a coaxial externally threaded stub 32 engaging a correspondingly tapped well in mount plate 21 to secure post 29 in a forwardly porjecting position on mount plate 21. A medial forwardly projecting diametrically extending hinge knuckle 33 is integrally formed on the front face of post 29 and has an arcuate end face 34.

The hinged assembly 28 also includes a front post 36 hinged end-to-end to rear post 29 and terminates at its rear in a pair of diametrically spaced knuckles 37 similar in shape to and sandwiching the knuckle 33, the arcuate faces of the knuckles slidably engaging the opposing faces of the posts 29 and 36. Each knuckle 37 is connected to an adjacent face of knuckle 33 by a respective pivot pin 38. The post 36 is provided with an axial bore 40 including a threaded intermediate section 39 and enlarged front and rear end sections or counterbores 40 and 41.

An elongated bolt or rod 42 having an enlarged front head 43 and a threaded front section 44 in the operative condition of the solder extractor device 10 extends through bore 30 and bore sections 39, 40, and 41 and engages the tapped well in mount plate 21 to lock posts 29 and 36 in coaxial end-to-end positions and to lock mount plate 17 to front post 36. Screws 28 engaging openings in mount plate 17 and tapped bores in spacer members 27 further secure the front section in its operative condition coaxial with rear section 12 and with coupling pipe 18 in slidable engagement with an axial bore or inlet opening in an elastomeric plug closing the front end of the tubular receiver housed in handle member 19.

In order to provide access to coupling tube 18 and expedite the cleaning and servicing of solder extractor device 10, screws 28 are removed and bolt 42 is loosened and withdrawn from post bore 30 to a retracted position with its threaded end in thread engagement with tapped bore section 39 in front post 36. The front section 11 is then advanced forwardly with mount plate 17 sliding along bolt 42 and limited in its forward movement by bolt head 43 to thereby withdraw coupling tube 18 from the receiver opening to at least rear mount plate 21. The front post 36, bolt 42 and front section 11 are then swung about hinge assembly 28 to provide access to couplng tube 18 and other components of device 10 for cleaning and servicing. The device 10, opened in the above manner, may be safely held by handle 19 to facilitate and expedite the cleaning and servicing procedure. The device 10 may be returned to its operative position following its cleaning and servicing by reversing the above procedure.

It should be noted that the rear section 12, and the receiver housed therein and the separable coupling thereto by coupling tube 18 may be so constructed that tube 18 may be uncoupled from the receiver merely by swinging the front section without the necessity of axially withdrawing the coupling tube from the receiver. In the aforesaid case, the rear post 36 may be securely affixed to mount plate 17 without the need for the axial separation of the front section 11 from the front post 36.

While there has been described and illustrated a preferred embodiment of the present invention it is apparent that numerous alterations, omissions and additions may be made without departing from the spirit thereof.

A solder extractor which is highly satisfactory is disclosed in copending U.S. patent application Ser. No. 010,639 filed Feb. 9, 1979, by William E. Scheu, Jr. and a solder extractor of the subject type is described in U.S. Pat. No. 3,392,897 granted July 16, 1968. However the cleaning of these solder extractors, particularly the front or working portions thereof, is often very difficult, generally requiring the disassembly of the device and the complete separation of the handle receiver and working sections thereof, a time-consuming and awkward procedure requiring a high degree of care to avoid injury to the person and damage to proximate objects.

I claim:

1. A solder extractor device comprising a rear section including a longitudinally extending hollow handle section housing a receiver receptable connectable to a suction source and having a front inlet opening, a front section including a bracket supporting a heater member engaging a forwardly projecting tubular tip member and a rearwardly extending coupling tube coupled to said tip member support means connecting said front section to the forward position of said rear section for swinging between a first position with the rear of said coupling tube in registry with said receiver inlet opening and a second position with the rear of said coupling tube out of registry with said inlet opening and means for releasably locking said front section in its first position.

2. The solder extractor device of claim 1 including means axially movably coupling said front section to said support for movement of said front section when in said first position between an advanced position with said coupling tube engaging said inlet opening and a restricted retracted position with said coupling tube withdrawn from said inlet opening.

3. The solder extractor device of claim 2 wherein said support means comprises a forwardly projecting first post mounted on the front end of said rear section transversely offset from the longitudinal axis thereof, a second post swingably connected to the forward end of said first post and means connecting said front section to said second post.

4. The solder extractor device of claim 3 wherein said posts have coaxial bores formed therein and including a rod having an enlarged head at its outer end and engaging said bores and slidably movable therein between an advanced position engaging said first post and a predetermined retracted position withdrawn from said first post and engaging said second post and means for releasably locking said rod in its advanced position said front section being slidable along said rod to a position restricted by said enlarged head when said rod is in its retracted position.

5. The solder extractor device of claim 4. Wherein said rear section includes a front mount plate on which said first post is located and said rear section includes a rear mount plate disposed forwardly of said front mount plate and to which said second post is coupled and including a spacer member located between said mount plates and transversely offset from said posts and screw means releasably coupling said mount plates through said spacer member.

6. The solder extractor device of claim 1 wherein said front section includes a transverse rear mount plate and said rear section includes a transverse front mount plate and including at least one eccentric spacer member located between said mount, said locking means including releasable screw means interconnecting said plate through said spacer member.

7. The solder extractor device of claim 6 wherein said support means includes a pair of end to end hinged posts, one of said posts being secured to said rear section front plate and means for securing the other posts to said front section rear plate.

8. The solder extractor device of claim 6 wherein said support means includes a pair of end to end hinged first and second posts, said first post being secured to and projecting forwardly from said rear section front plate and including means for alternatively locking said front section rear plate to said second post and said posts in end to end coaxial positions and for permitting the relative swinging of said posts and the longitudinal retraction of said front section rear plate from said second post to a predetermined withdrawn position.

* * * * *